(12) United States Patent
Okuda et al.

(10) Patent No.: US 12,533,948 B2
(45) Date of Patent: Jan. 27, 2026

(54) POWER TRANSMISSION DEVICE AND DRIVE DEVICE

(71) Applicant: TOYOTA JIDOSHA KABUSHIKI KAISHA, Toyota (JP)

(72) Inventors: Koichi Okuda, Toyota (JP); Yusuke Suzuki, Nisshin (JP); Yuuki Takahashi, Fukuyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/444,306

(22) Filed: Feb. 16, 2024

(65) Prior Publication Data

US 2024/0278639 A1 Aug. 22, 2024

(30) Foreign Application Priority Data

Feb. 22, 2023 (JP) ................................ 2023-026050

(51) Int. Cl.
*B60K 17/04* (2006.01)
*B60K 7/00* (2006.01)
*F16H 57/021* (2012.01)
*F16H 57/02* (2012.01)

(52) U.S. Cl.
CPC .......... *B60K 17/043* (2013.01); *B60K 7/0007* (2013.01); *F16H 57/021* (2013.01); *B60K 2007/0061* (2013.01); *F16H 2057/02034* (2013.01); *F16H 2057/02052* (2013.01)

(58) Field of Classification Search
CPC ................ B60K 17/043; B60K 7/0007; B60K 2007/0061; F16H 57/021; F16H 2057/02034; F16H 2057/02052
See application file for complete search history.

(56) References Cited

U.S. PATENT DOCUMENTS

2012/0258831 A1* 10/2012 Knoblauch .......... B60K 7/0007
475/5
2020/0200247 A1* 6/2020 Kang ....................... B60K 1/00

FOREIGN PATENT DOCUMENTS

| EP | 4 471 293 A1 | 12/2024 | | |
|---|---|---|---|---|
| JP | 2016205444 A | * | 12/2016 | ............... B60K 1/02 |
| JP | 2017025969 A | * | 2/2017 | ............... B60K 1/00 |
| JP | 2019-120313 A | | 7/2019 | |

* cited by examiner

*Primary Examiner* — Zakaria Elahmadi
(74) *Attorney, Agent, or Firm* — Finnegan, Henderson, Farabow, Garrett and Dunner, LLP

(57) ABSTRACT

A power transmission device includes a housing having a first chamber and a second chamber, a left gear unit accommodated in the first chamber and having a first rotation shaft, and a right gear unit accommodated in the second chamber and having a second rotation shaft located coaxially with the first rotation shaft. The housing has a center housing located between the first chamber and the second chamber. The center housing has a flat plate portion, a first bearing support portion supporting a first bearing located at a first end of the first rotation shaft, and a second bearing support portion supporting a second bearing located at a first end of the second rotation shaft. The flat plate portion is provided with a gap in at least a part of an annular region located between the first bearing support portion and the second bearing support portion.

6 Claims, 5 Drawing Sheets

POWER TRANSMISSION DEVICE AND DRIVE DEVICE

CROSS-REFERENCE TO RELATED APPLICATION

This application claims priority to Japanese Patent Application No. 2023-026050 filed on Feb. 22, 2023, incorporated herein by reference in its entirety.

BACKGROUND

1. Technical Field

The technology disclosed in this specification relates to a power transmission device and a drive device.

2. Description of Related Art

Japanese Unexamined Patent Application Publication No. 2016-205444 (JP 2016-205444 A) discloses a power transmission device including a housing having a first chamber and a second chamber, a first gear unit accommodated in the first chamber and having a first rotation shaft, and a second gear unit accommodated in the second chamber and having a second rotation shaft located coaxially with the first rotation shaft. The housing has a center housing located between the first chamber and the second chamber. The center housing has a flat plate portion, a first bearing support portion protruding from the flat plate portion toward the first chamber and supporting a first bearing located at a first end of the first rotation shaft, and a second bearing support portion protruding from the flat plate portion toward the second chamber and supporting a second bearing located at a first end of the second rotation shaft.

SUMMARY

In the power transmission device of JP 2016-205444 A, the first bearing support portion and the second bearing support portion are continuously connected via the flat plate portion. With such a configuration, when a force is applied to the first bearing support portion from the first rotation shaft, the flat plate portion is elastically deformed together with the first bearing support portion, which may cause displacement of the second bearing support portion. Similarly, when a force is applied to the second bearing support portion from the second rotation shaft, the flat plate portion is elastically deformed together with the second bearing support portion, which may cause displacement of the first bearing support portion. When such displacement occurs in the first bearing support portion and the second bearing support portion, for example, the durability of the first bearing and the second bearing supported thereby is reduced. As a result, the durability of the power transmission device decreases.

This specification provides a technology capable of improving the durability of a power transmission device.

A first aspect of the present disclosure relates to a power transmission device including a housing, a first gear unit, and a second gear unit. The housing has a first chamber, a second chamber, and a center housing, and the center housing is located between the first chamber and the second chamber. The first gear unit is accommodated in the first chamber and has a first rotation shaft. The second gear unit is accommodated in the second chamber and has a second rotation shaft located coaxially with the first rotation shaft. The center housing has a flat plate portion, a first bearing support portion protruding from the flat plate portion toward the first chamber and supporting a first bearing located at a first end of the first rotation shaft, and a second bearing support portion protruding from the flat plate portion toward the second chamber and supporting a second bearing located at a first end of the second rotation shaft. The flat plate portion is provided with a gap in at least a part of an annular region located between the first bearing support portion and the second bearing support portion.

In the power transmission device of the first aspect, the flat plate portion is provided with the gap, and the gap is interposed between the first bearing support portion and the second bearing support portion. With such a configuration, even when a force is applied from the first rotation shaft to the first bearing support portion and the flat plate portion is elastically deformed together with the first bearing support portion, as the deformation is absorbed at the gap, displacement occurring in the second bearing support portion is suppressed. Similarly, when a force is applied to the second bearing support portion from the second rotation shaft, displacement occurring in the first bearing support portion is suppressed. As a result, for example, forces acting unintentionally on the first bearing and the second bearing are suppressed, and thus the durability of the power transmission device is improved.

In the first aspect, the gap may be provided over an entirety of the annular region.

With the above-described configuration, elastic deformation occurring in one of the first bearing support portion and the second bearing support portion can be sufficiently absorbed in the gap. Thereby, the durability of the power transmission device can be further improved.

In the first aspect, the gap may extend from the annular region to an outer peripheral edge of the flat plate portion along a first direction perpendicular to a rotation axis direction of the first rotation shaft. That is, the gap may be open toward the first direction.

With the above-described configuration, it is easy to form the flat plate portion having the gap. Also, part of the center housing that defines the gap has a cantilever shape. Therefore, forces transmitted to the first bearing support portion and the second bearing support portion can be suppressed.

In the first aspect, the first gear unit may further have a first gear supported by the first rotation shaft, a third gear meshing with the first gear, and a third rotation shaft supporting the third gear. The first direction may be a direction forming an angle with a direction connecting a rotation axis of the first rotation shaft and a rotation axis of the third rotation shaft.

The force applied from the first bearing to the first bearing support portion acts along the direction connecting the rotation axis of the first rotation shaft and the rotation axis of the third rotation shaft. Therefore, the flat plate portion supporting the first bearing support portion is required to have high rigidity in the direction connecting the rotation axis of the first rotation shaft and the rotation axis of the third rotation shaft. On the other hand, the rigidity of the flat plate portion decreases in the portion where the gap is provided. Regarding these points, in the above-described configuration, the first direction, in which the gap extends in the flat plate portion, does not match the direction connecting the rotation axis of the first rotation shaft and the rotation axis of the third rotation shaft. This allows the gap to be easily provided in the flat plate portion while maintaining the required rigidity of the flat plate portion.

In the first aspect, the first gear unit may further have a first gear supported by the first rotation shaft, a third gear meshing with the first gear, a third rotation shaft supporting the third gear, and a third bearing support portion for supporting a third bearing located at a second end of the first rotation shaft. A tooth trace of the first gear may be inclined so as to be displaced forward in a rotational direction of the first gear as the tooth trace approaches the center housing.

In the configuration, helical gears are employed for the first gear and the third gear meshing therewith. In this case, a reaction force perpendicular to each rotation shaft, as well as a reaction force parallel to each rotation shaft, acts on the first gear and third gear that mesh with each other. In this case, when the tooth trace of the first gear is displaced forward in the rotational direction of the first gear as it approaches the center housing, a reaction force acts on the first gear in a direction away from the flat plate portion along the first rotation shaft. As a result, the force acting on the first bearing support portion supporting the first rotation shaft in the flat plate portion is less than the force acting on the third bearing support portion supporting the first rotation shaft on the opposite side. As a result, the amount of elastic deformation of the first bearing support portion can be reduced, and thus the durability of the power transmission device can be improved.

In the first aspect, the gap may extend from an inner region surrounded by the annular region to an outer region located outside the annular region.

With the above-described configuration, elastic deformation occurring in one of the first bearing support portion and the second bearing support portion can be more effectively absorbed in the gap.

In the first aspect, the first gear unit and the second gear unit may have structures that are plane-symmetrical with each other.

A second aspect of the present disclosure relates to a drive device for a vehicle including the power transmission device according to the first aspect, a first motor, and a second motor. The first motor is accommodated in the first chamber and is configured to drive the first gear unit. The second motor is accommodated in the second chamber and is configured to drive the second gear unit. The first motor and the second motor may be arranged plane-symmetrically with each other. The first gear unit may be a reduction gear configured to amplify torque of the first motor, and the first rotation shaft of the first gear unit may be connected to a left wheel of the vehicle via a drive shaft. The second gear unit may be a reduction gear configured to amplify torque of the second motor, and the second rotation shaft of the second gear unit may be connected to a right wheel of the vehicle via a drive shaft.

In the configuration, since the amplified torque of the first motor acts on the first rotation shaft, a relatively large force acts on the first bearing support portion from the first rotation shaft. Similarly, a relatively large force acts on the second bearing support portion. Therefore, a relatively large elastic deformation may occur in the first bearing support portion and the second bearing support portion. By adopting the present technology in such a configuration and providing the gap in the flat plate portion interposed between the first bearing support portion and the second bearing support portion, the durability of the drive device can be effectively improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Example

Figure 1:
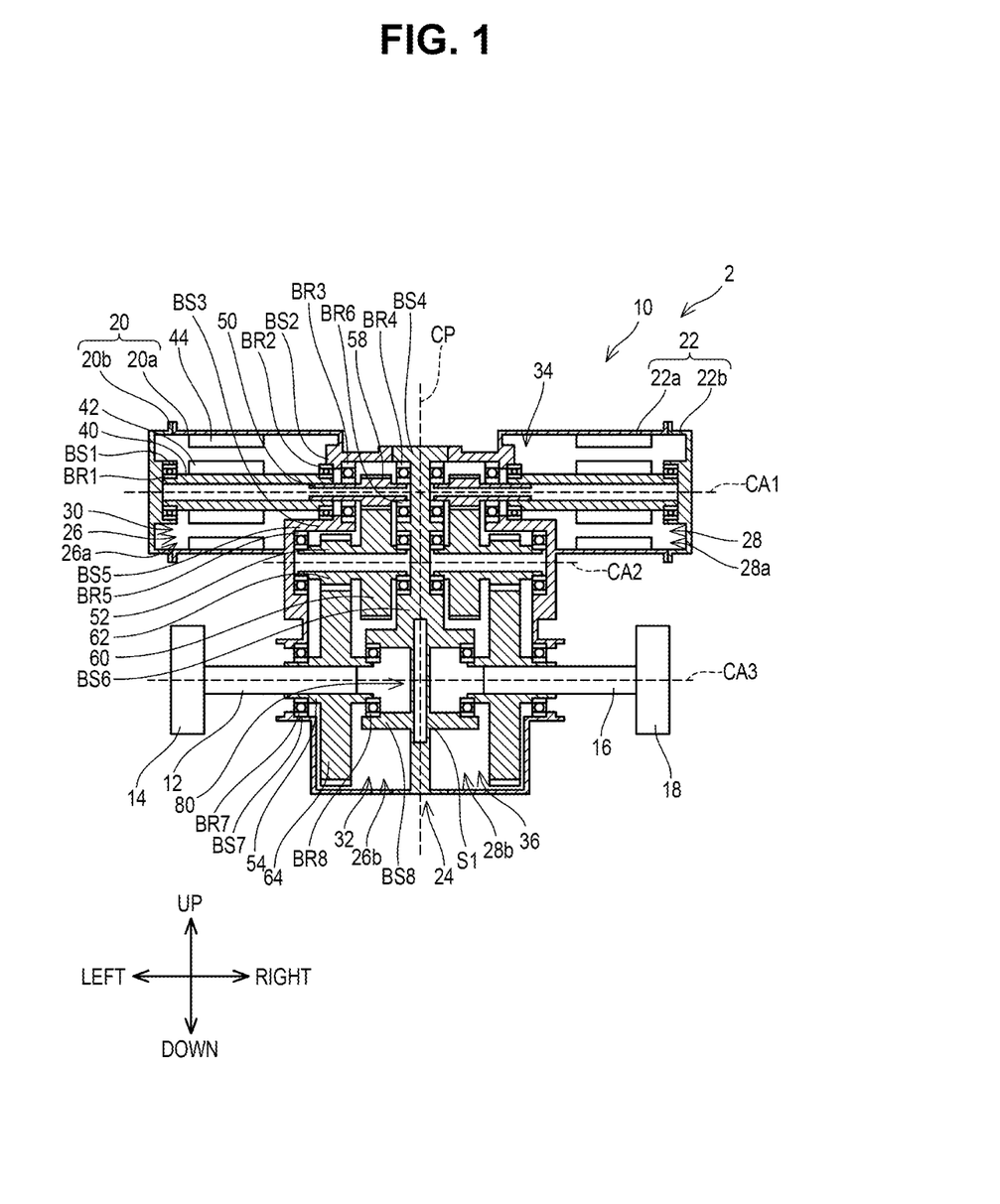
FIG. 1 is a schematic diagram of a vehicle.
Figure 2:
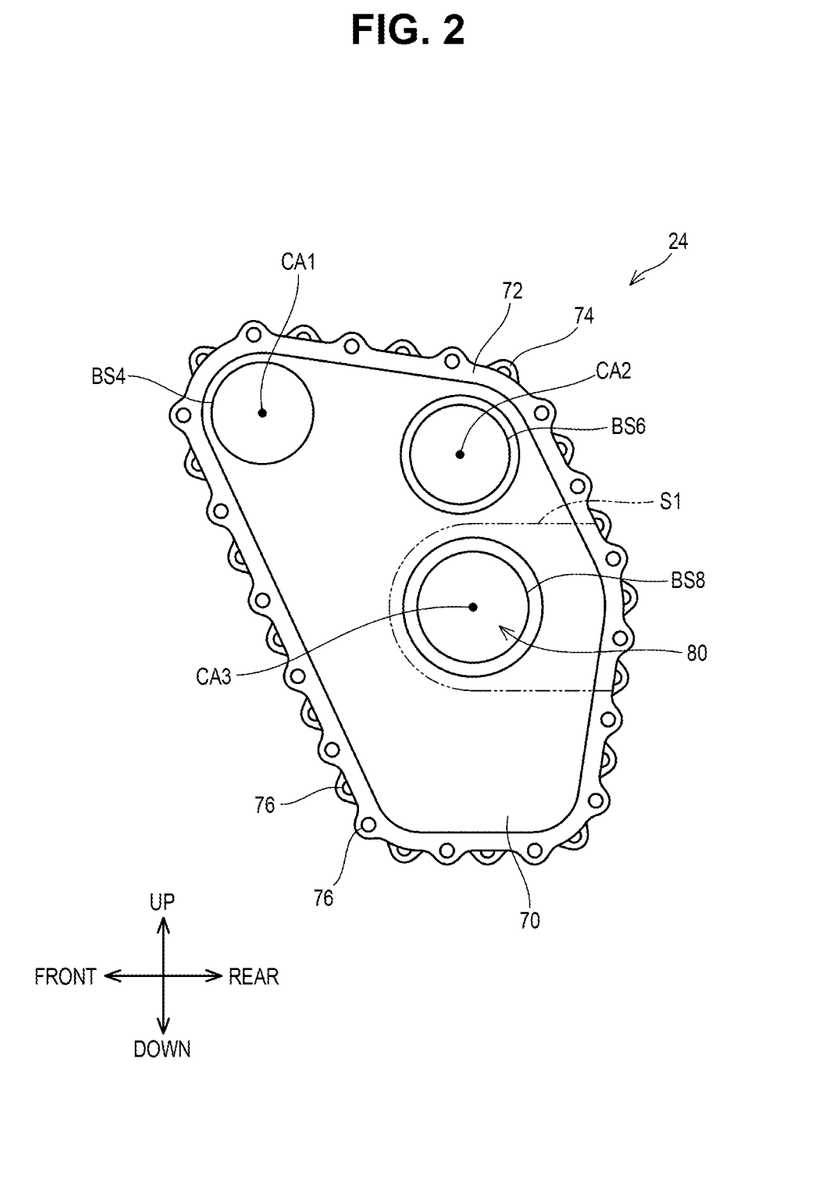
FIG. 2 is a left view of a center housing viewed from the left side.
Figure 3:
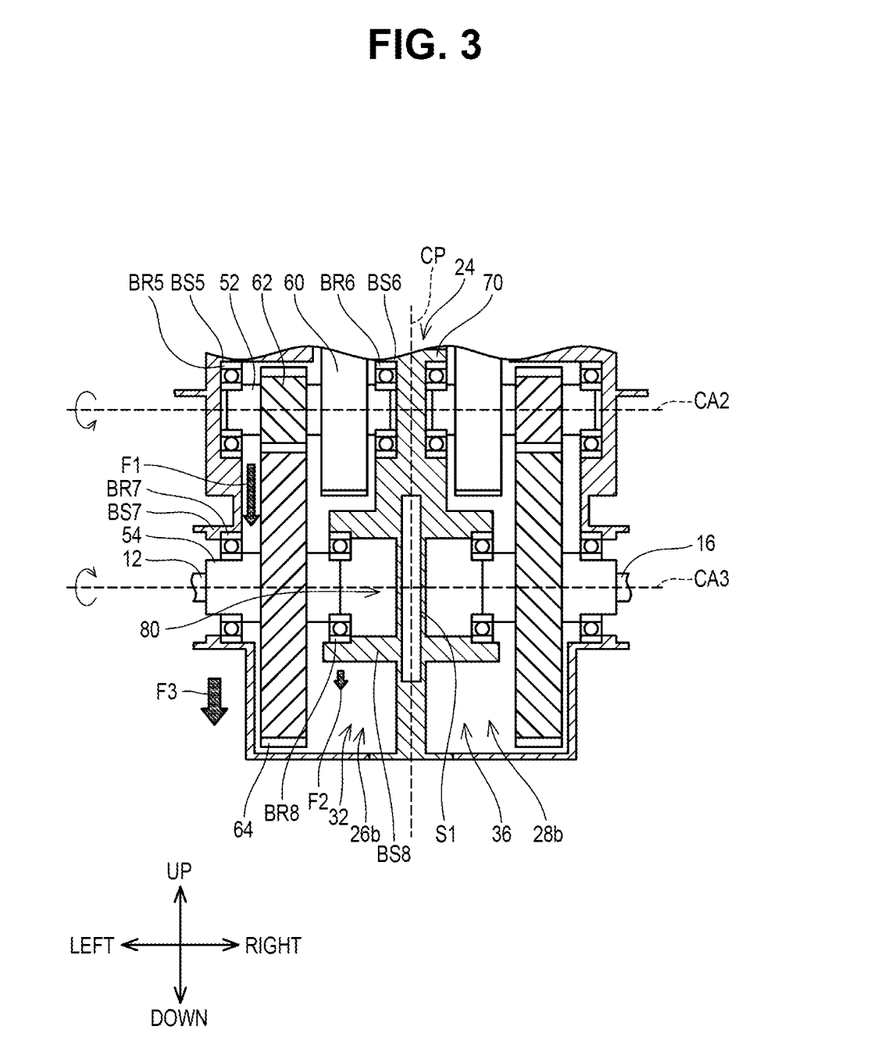
FIG. 3 is an enlarged schematic diagram of a part of a left gear unit and a right gear unit.

A vehicle 2 of this example will be described with reference to FIGS. 1 to 3. FIG. 2 is a diagram of a flat plate portion 70 viewed from the left side. FIGS. 1 and 3 are schematic cross-sectional views of the vehicle 2 for making the description easier to understand. In FIG. 3, only a third intermediate gear 62 and a fourth intermediate gear 64 are illustrated in a schematic plan view in order to facilitate understanding of tooth traces of the third intermediate gear 62 and the fourth intermediate gear 64. Further, in FIG. 3, the tooth traces of the third intermediate gear 62 and the fourth intermediate gear 64 are illustrated by bold lines. Hereinafter, a traveling direction of the vehicle 2 will be referred to as a "front and rear direction", a right and left direction when the vehicle 2 is facing forward will be referred to as a "right and left direction", and a direction perpendicular to the front and rear direction and the right and left direction will be referred to as an "up and lower direction".

As illustrated in FIG. 1, the vehicle 2 includes a housing 10, a left drive shaft 12, a left rear wheel 14, a right drive shaft 16, and a right rear wheel 18. The vehicle 2 is, for example, a battery electric vehicle, a hybrid electric vehicle, a plug-in hybrid electric vehicle, or a fuel cell electric vehicle.

The housing 10 includes a left housing 20, a right housing 22, and a center housing 24. The left housing 20 is attached to the left side of the center housing 24, and the right housing 22 is attached to the right side of the center housing 24. The housing 10 has a left accommodation chamber 26 and a right accommodation chamber 28. The left accommodation chamber 26 is defined by the left housing 20 and the center housing 24. The right accommodation chamber 28 is defined by the right housing 22 and the center housing 24.

The left housing 20 includes a main body 20a and a cover 20b. The cover 20b is attached to a left end portion of the main body 20a. The right housing 22 includes a main body 22a and a cover 22b. The cover 22b is attached to a right end portion of the main body 22a.

The left accommodation chamber 26 includes a left motor accommodation chamber 26a that accommodates a left motor 30, and a left gear accommodation chamber 26b that accommodates a left gear unit 32. The right accommodation chamber 28 includes a right motor accommodation chamber 28a that accommodates a right motor 34, and a right gear accommodation chamber 28b that accommodates a right gear unit 36. The right motor 34 has a configuration that is plane-symmetrical to the left motor 30 with a center plane CP interposed therebetween. The center plane CP is a plane including the up and lower direction and the front and rear direction. The right gear unit 36 has a configuration that is plane-symmetrical to the left gear unit 32 with the center plane CP extending inside the center housing 24 interposed therebetween. Below, the configurations of the left motor 30 and the left gear unit 32 will be described. In the right motor 34 and the right gear unit 36, the reference numerals and letters have been omitted for components of the right motor 34 and the right gear unit 36 that are the same as those of the left motor 30 and the left gear unit 32 for ease of viewing.
Configuration of Left Motor 30

The left motor 30 has a motor shaft 40, a rotor 42, and a stator 44. The motor shaft 40 extends along a central axis CA1 extending in the right and left direction. The motor shaft 40 is rotatably supported on the left housing 20 by bearings BR1 and BR2. The left housing 20 is provided with bearing support portions BS1 and BS2 that support the bearings BR1 and BR2. The rotor 42 is fixed to the motor shaft 40. The stator 44 is fixed to an inner wall of the left housing 20.
Configuration of Left Gear Unit 32

The left gear unit 32 includes a first gear shaft 50, a second gear shaft 52, and a third gear shaft 54. A left end portion of the first gear shaft 50 is attached to the motor shaft 40. The first gear shaft 50 extends along the central axis CA1. The first gear shaft 50 is rotatably supported by the left housing 20 via a bearing BR3, and is rotatably supported by the center housing 24 via a bearing BR4. The first gear shaft 50 rotatably supports a first intermediate gear 58. The first intermediate gear 58 may be a spur gear or a helical gear. The left housing 20 is provided with a bearing support portion BS3 that supports the bearing BR3, and the center housing 24 is provided with a bearing support portion BS4 that supports the bearing BR4.

The second gear shaft 52 extends along a central axis CA2 that extends in the right and left direction. The second gear shaft 52 is rotatably supported by the left housing 20 via a bearing BR5, and is rotatably supported by the center housing 24 via a bearing BR6. The second gear shaft 52 rotatably supports a second intermediate gear 60 and the third intermediate gear 62. The second intermediate gear 60 meshes with the first intermediate gear 58 of the first gear shaft 50. The second intermediate gear 60 may be a spur gear or a helical gear. The outer diameter of the second intermediate gear 60 is larger than the outer diameter of the first intermediate gear 58. As illustrated in FIG. 3, the third intermediate gear 62 is a so-called helical gear, and its tooth trace is inclined so as to be displaced forward in a rotational direction of the third intermediate gear 62 as it approaches the center housing 24. The outer diameter of the third intermediate gear 62 is smaller than the outer diameter of the second intermediate gear 60. As illustrated in FIG. 1, the left housing 20 is provided with a bearing support portion BS5 that supports the bearing BR5, and the center housing 24 is provided with a bearing support portion BS6 that supports the bearing BR6.

The third gear shaft 54 extends along a central axis CA3 that extends in the right and left direction. The third gear shaft 54 is rotatably supported by the left housing 20 via a bearing BR7 and rotatably supported by the center housing 24 via a bearing BR8. The third gear shaft 54 rotatably supports the fourth intermediate gear 64. The fourth intermediate gear 64 meshes with the third intermediate gear 62 of the second gear shaft 52. As illustrated in FIG. 3, the fourth intermediate gear 64 is a so-called helical gear, and its tooth trace is inclined so as to be displaced forward in a rotational direction of the fourth intermediate gear 64 as it approaches the center housing 24. The outer diameter of the fourth intermediate gear 64 is larger than the outer diameter of each of the first to third intermediate gears 58 to 62. As illustrated in FIG. 1, the left housing 20 is provided with a bearing support portion BS7 that supports the bearing BR7, and the center housing 24 is provided with a bearing support portion BS8 that supports the bearing BR8.

A first end (right end) of the left drive shaft 12 is connected to the third gear shaft 54 of the left gear unit 32, and a second end (left end) of the left drive shaft 12 is connected to the left rear wheel 14. A first end (left end) of the right drive shaft 16 is connected to the third gear shaft 54 of the right gear unit 36, and a second end (right end) of the right drive shaft 16 is connected to the right rear wheel 18.

As described above, the right motor 34 and the right gear unit 36 have plane-symmetrical configurations with the left motor 30 and the left gear unit 32, respectively, with the center plane CP interposed therebetween. Therefore, the first gear shaft 50 on the right side, the second gear shaft 52 on the right side, and the third gear shaft 54 on the right side are respectively provided coaxially with the first gear shaft 50 on the left side, the second gear shaft 52 on the left side, and the third gear shaft 54 on the left side.
Configuration of Center Housing 24

As illustrated in FIG. 2, the center housing 24 includes the flat plate portion 70, a left attachment portion 72, and a right attachment portion 74. The left attachment portion 72 protrudes leftward from the left surface of the flat plate portion 70 and defines the left outer periphery of the center housing 24. The left attachment portion 72 is provided with a plurality of screw holes 76 for fixing the left housing 20 to the center housing 24. The right attachment portion 74 protrudes rightward from the right surface of the flat plate portion 70 and defines the right outer periphery of the center housing 24. The right attachment portion 74 is provided with a plurality of screw holes 76 for fixing the right housing 22 to the center housing 24.

The flat plate portion 70 is provided with the bearing support portions BS4, BS6, BS8. The bearing support portions BS4, BS6, BS8 provided on the left side of the flat plate portion 70 protrude from the left side of the flat plate portion 70 toward the left, that is, toward the left accommodation chamber 26 (front side of the page of FIG. 2). Also, the bearing support portions BS4, BS6, BS8 (see FIG. 1) provided on the right side of the flat plate portion 70 protrude from the right side of the flat plate portion 70 toward the right, that is, toward the right accommodation chamber 28 (back side of the page of FIG. 2). The bearing support portions BS4, BS6, BS8 have a cylindrical shape. The flat plate portion 70 may be provided with a plurality of opening portions through which oil flowing through the left accommodation chamber 26 and the right accommodation chamber 28 passes. Further, the flat plate portion 70 may be provided with a plurality of ribs to increase the strength of the center housing 24.

As illustrated in FIG. 1, the flat plate portion 70 is provided with a gap S1 in the entirety of an annular region 80 located between the bearing support portion BS8 on the left side and the bearing support portion BS8 on the right side. In FIG. 2, the region where the gap S1 is provided is indicated by a two-dot chain line. The gap S1 extends from the annular region 80 to the outer peripheral edge of the flat plate portion 70 along a direction (that is, the front and rear direction) perpendicular to a direction that vertically connects the central axis CA2 of the second gear shaft 52 and the central axis CA3 of the third gear shaft 54, Specifically, the gap S1 extends in a direction perpendicular to the central axis CA3 of the third gear shaft 54. That is, the gap S1 is open toward the rear. No gap is provided in an annular region located between the bearing support portion BS4 on the left side and the bearing support portion BS4 on the right side and an annular region located between the bearing support portion BS6 on the left side and the bearing support portion BS6 on the right side.

With reference to FIGS. 1 and 3, a force applied from the third gear shaft 54 to the bearing support portion BS7 of the left housing 20 and the bearing support portion BS8 of the center housing 24 when the left motor 30 is driven will be described.

When the left motor 30 in FIG. 1 is driven, the motor shaft 40 rotates. As the motor shaft 40 rotates, the first gear shaft 50 attached to the motor shaft 40 rotates. As the first gear shaft 50 rotates, the first intermediate gear 58 rotatably supported by the first gear shaft 50, the second intermediate gear 60 meshing with the first intermediate gear 58, and the second gear shaft 52 rotatably supporting the second intermediate gear 60 rotate. Then, as the second gear shaft 52 rotates, the third intermediate gear 62 rotatably supported by the second gear shaft 52, the fourth intermediate gear 64 meshing with the third intermediate gear 62, and the third gear shaft 54 rotatably supporting the fourth intermediate gear 64 rotate. In FIG. 3, the third intermediate gear 62 rotates from top to bottom, and the fourth intermediate gear 64 rotates from the bottom to the top. That is, the third intermediate gear 62 rotates in a direction toward the fourth intermediate gear 64, and the fourth intermediate gear 64 rotates in a direction toward the third intermediate gear 62. In this case, an upward force acts on the third intermediate gear 62, and a downward force F1 is generated on the fourth intermediate gear 64. The third gear shaft 54 to which the fourth intermediate gear 64 is fixed is supported by the bearing support portions BS7, BS8. Therefore, when the force F1 is generated in the fourth intermediate gear 64, a force is applied from the third gear shaft 54 to the bearing support portions BS7, BS8. In this embodiment, the tooth trace of the fourth intermediate gear 64 is inclined so that as it approaches the center housing 24, it is displaced forward in the rotational direction of the fourth intermediate gear 64. A thrust force acts on the fourth intermediate gear 64 in a direction away from the center housing 24. Therefore, a force F2 applied to the bearing support portion BS8 located on a side of the center housing 24 with respect to the fourth intermediate gear 64 is smaller than a force F3 applied to the bearing support portion BS7 located on an opposite side of the center housing 24 with respect to the fourth intermediate gear 64.

When the force F2 is applied to the bearing support portion BS8 on the left side, the bearing support portion BS8 on the left side and the left portion of the flat plate portion 70 are elastically deformed. When the bearing support portion BS8 on the left side and the bearing support portion BS8 on the right side are continuously connected via the flat plate portion 70, the elastic deformation of the flat plate portion 70 together with the elastic deformation of the bearing support portion BS8 on the left side may cause displacement of the bearing support portion BS8 on the right side. In this example, since the gap S1 is provided in the entirety of the annular region 80 of the flat plate portion 70, even when the flat plate portion 70 is elastically deformed together with the bearing support portion BS8 on the left side, the deformation is absorbed by the gap S1, thereby suppressing displacement occurring in the bearing support portion BS8 on the right side.

Effects of this Example

Hereinafter, the housing 10, the left gear unit 32, and the right gear unit 36 will be collectively referred to as a "power transmission device". Further, the power transmission device, the left motor 30, and the right motor 34 are collectively referred to as a "drive device".

As described above, the power transmission device includes the housing 10 having the left accommodation chamber 26 (an example of a "first chamber") and a right accommodation chamber 28 (an example of a "second chamber"), the left gear unit 32 (an example of a "first gear unit") accommodated in the left accommodation chamber 26 and having the third gear shaft 54 (an example of a "first rotation shaft") on the left side, and the right gear unit 36 (an example of a "second gear unit") accommodated in the right accommodation chamber 28 and having the third gear shaft 54 (an example of a "second rotation shaft") on the right side located coaxially with the third gear shaft 54 on the left side. The housing 10 has the center housing 24 located between the left accommodation chamber 26 and the right accommodation chamber 28. The center housing 24 has the flat plate portion 70, the bearing support portion BS8 (an example of a "first bearing support portion") on the left side that protrudes from the flat plate portion 70 toward the left accommodation chamber 26 and supports the bearing BR8 (an example of a "first bearing") on the left side located at a first end of the third gear shaft 54 on the left side, and the bearing support portion BS8 (an example of a "second bearing support portion") on the right side that protrudes from the flat plate portion 70 toward the right accommodation chamber 28 and supports the bearing BR8 (an example of a "second bearing") on the right side located at a first end of the third gear shaft 54 on the right side. The flat plate portion 70 is provided with the gap S1 in at least a part of the annular region 80 located between the bearing support portion BS8 on the left side and the bearing support portion BS8 on the right side.

According to the above-described configuration, the gap S1 is provided in the flat plate portion 70, and the gap S1 is interposed between the bearing support portion BS8 on the left side and the bearing support portion BS8 on the right side. According to such a configuration, even when a force is applied from the third gear shaft 54 on the left side to the bearing support portion BS8 on the left side, and the flat plate portion 70 is elastically deformed together with the bearing support portion BS8 on the left side, since the deformation is absorbed in the gap, displacement occurring in the bearing support portion BS8 on the right side is suppressed. Similarly, when a force is applied from the third gear shaft 54 on the right side to the bearing support portion BS8 on the right side, displacement occurring in the bearing support portion BS8 on the left side is suppressed. As a result, for example, forces acting unintentionally on the bearing support portion BS8 on the left side and the bearing support portion BS8 on the right side are suppressed, improving the durability of the power transmission device.

Also, the gap S1 is provided over the entirety of the annular region 80.

According to the above-described configuration, the elastic deformation occurring in one of the bearing support portion BS8 on the left side and the bearing support portion BS8 on the right side can be sufficiently absorbed in the gap S1. Thereby, the durability of the power transmission device can be further improved.

Further, the gap S1 extends from the annular region 80 to the outer peripheral edge of the flat plate portion 70 along the front and rear direction (an example of a "first direction")

perpendicular to a rotation axis direction of the third gear shaft 54 on the left side. That is, the gap S1 is open in the front and rear direction.

According to the above-described configuration, it is easy to form the flat plate portion 70 having the gap S1. Further, since a part of the flat plate portion 70 defining the gap S1 has a cantilever shape, transmission of force can be suppressed. Therefore, the force transmitted to the bearing support portion BS8 on the left side and the bearing support portion BS8 on the right side can be suppressed.

In addition, the left gear unit 32 further has the fourth intermediate gear 64 (an example of a "first gear") supported by the third gear shaft 54, the third intermediate gear 62 (an example of a "third gear") meshing with the fourth intermediate gear 64, and the second gear shaft 52 (an example of a "third rotation shaft") supporting the third intermediate gear 62. A direction in which the gap S1 extends is a direction that forms an angle with the direction connecting the rotation axis of the third gear shaft 54 and the rotation axis of the second gear shaft 52.

The force applied from the bearing BR8 on the left side to the bearing support portion BS8 on the left side acts along the direction connecting the rotation axis of the third gear shaft 54 and the rotation axis of the second gear shaft 52. Therefore, the flat plate portion 70 that supports the bearing support portion BS8 on the left side is required to have high rigidity in the direction connecting the rotation axis of the third gear shaft 54 and the rotation axis of the second gear shaft 52. On the other hand, the rigidity of the flat plate portion 70 is reduced at the portion where the gap S1 is provided. Regarding these points, in the above-described configuration, a direction in which the gap S1 extends in the flat plate portion 70 does not match a direction in which the rotation axis of the third gear shaft 54 and the rotation axis of the second gear shaft 52 are connected. Thereby, the gap S1 can be easily provided to the flat plate portion 70 while maintaining the required rigidity of the flat plate portion 70.

In addition, the left gear unit 32 further has the fourth intermediate gear 64 supported by the third gear shaft 54, the third intermediate gear 62 meshing with the fourth intermediate gear 64, the second gear shaft 52 supporting the third intermediate gear 62, and the bearing support portion BS7 (an example of a "third bearing support portion") supporting the bearing BR7 (an example of a "third bearing") located at the second end of the third gear shaft 54. The tooth trace of the fourth intermediate gear 64 is inclined so as to be displaced forward in the rotational direction of the fourth intermediate gear 64 as it approaches the center housing 24.

In the above-described configuration, helical gears are used for the fourth intermediate gear 64 and the third intermediate gear 62 meshing therewith. In this case, a reaction force perpendicular to each rotation shaft, as well as a reaction force parallel to each rotation shaft, acts on the fourth intermediate gear 64 and the third intermediate gear 62 that mesh with each other. In this case, when the tooth trace of the fourth intermediate gear 64 is displaced forward in the rotational direction of the fourth intermediate gear 64 as it approaches the center housing 24, a reaction force acts on the fourth intermediate gear 64 along the third gear shaft 54 in a direction away from the flat plate portion 70. As a result, the force acting on the bearing support portion BS8 on the left side that supports the third gear shaft 54 in the flat plate portion 70 is smaller than the force acting on the bearing support portion BS7 on the left side that supports the third gear shaft 54 on the opposite side. Thereby, the amount of elastic deformation of the bearing support portion BS7 on the left side can be reduced, and thus the durability of the power transmission device can be improved.

Further, the left gear unit 32 and the right gear unit 36 have structures that are plane-symmetrical to each other.

In addition, the drive device for the vehicle includes the power transmission device, the left motor 30 (an example of a "first motor") accommodated in the left accommodation chamber 26 and driving the left gear unit 32, and the right motor 34 (an example of a "second motor") accommodated in the right accommodation chamber 28 and driving the right gear unit 36. The left motor 30 and the right motor 34 are arranged plane-symmetrically to each other. The third gear shaft 54 on the left side of the left gear unit 32 is connected to the left rear wheel 14 of the vehicle 2 via the left drive shaft 12, and the third gear shaft 54 on the right side of the right gear unit 36 is connected to a right rear wheel 18 of the vehicle 2 via the right drive shaft 16.

In the above-described configuration, since the amplified torque of the left motor 30 acts on the third gear shaft 54, a relatively large force acts on the bearing support portion BS8 on the left side from the third gear shaft 54. Similarly, a relatively large force acts on the bearing support portion BS8 on the right side. Therefore, a relatively large elastic deformation may occur in the bearing support portion BS8 on the left side and the bearing support portion BS8 on the right side. By adopting the present technology in such a configuration and providing the gap S1 in the flat plate portion 70 interposed between the bearing support portion BS8 on the left side and the bearing support portion BS8 on the right side, the durability of the drive device can be effectively improved.

Second Example

The vehicle 2 of a second example will be described with reference to FIGS. 4 and 5. In the vehicle 2 of the second example, the configuration of the flat plate portion 70 of the center housing 24 is different from the configuration of the flat plate portion 70 of the center housing 24 of the first example. In addition, the same reference numerals and letters are attached to components which are the same between the examples, and the descriptions thereof will be omitted.

Figure 4:
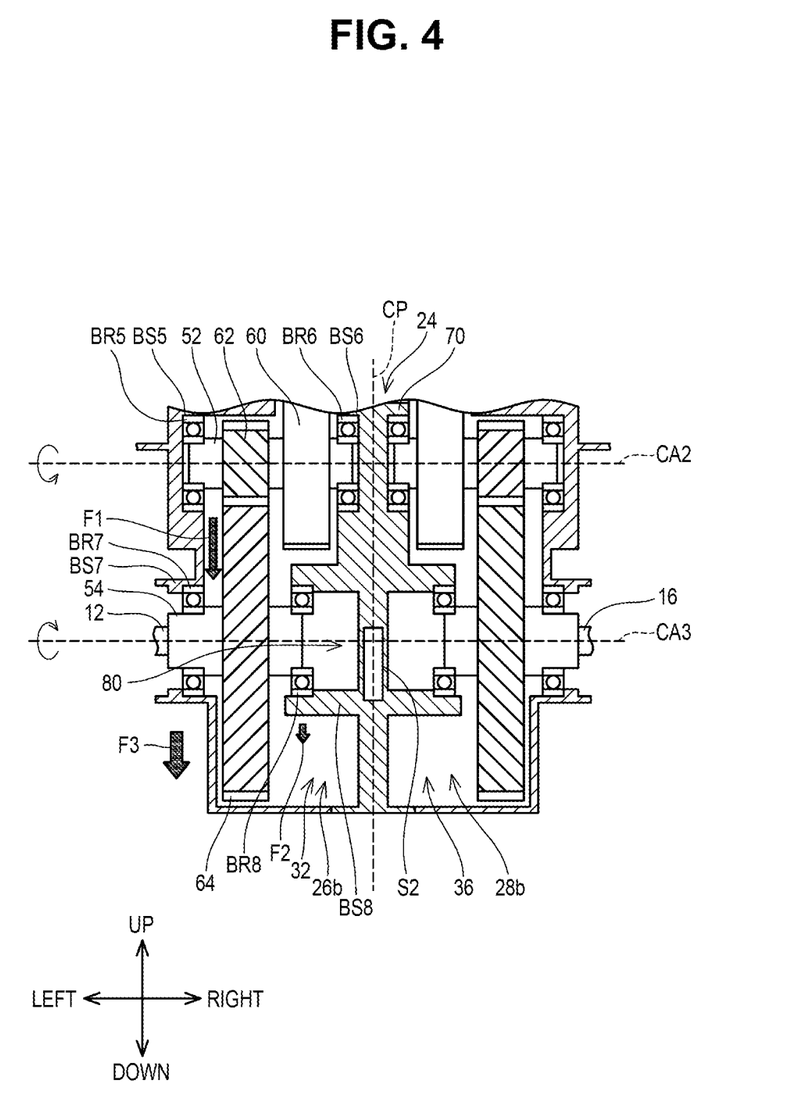
FIG. 4 is an enlarged schematic diagram of a part of a left gear unit and a right gear unit of a second example.
Figure 5:
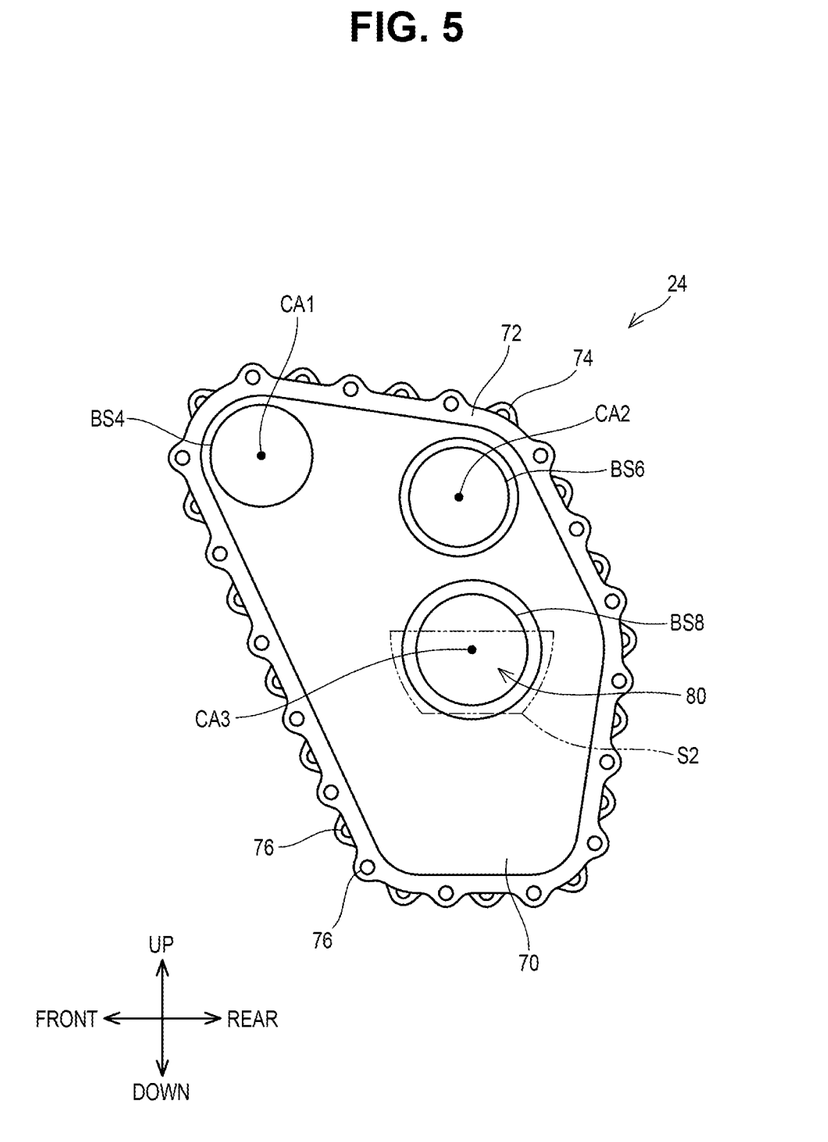
FIG. 5 is a left view of a center housing of the second example when viewed from the left side.

As illustrated in FIG. 4, the flat plate portion 70 is provided with a gap S2 in a part of the annular region 80 located between the bearing support portion BS8 on the left side and the bearing support portion BS8 on the right side. That is, part of the annular region 80 is solid. In FIG. 5, the region where the gap S2 is provided is indicated by a dash double-dotted line. The gap S2 extends from an inner region surrounded by the annular region 80 to an outer region located outside the annular region 80. In this example, it extends downward from a position slightly above the central axis CA3. The gap S2 does not extend to an outer peripheral edge of the flat plate portion 70.

As described above, the gap S2 extends from an inner region surrounded by the annular region 80 to an outer region located outside of the annular region 80.

With the above-described configuration, the elastic deformation occurring in one of the bearing support portion BS8 on the left side and the bearing support portion BS8 on the right side can be more effectively absorbed in the gap S2.

Although specific examples of the technology disclosed in this specification are described above in detail, these are merely examples and do not limit the scope of the claims.

The technologies described in the claims include various modifications and changes to the specific examples illustrated above.

First Modification Example

In the first example, the gap S1 may not extend in a direction perpendicular to the direction connecting the rotation axis of the third gear shaft 54 and the rotation axis of the second gear shaft 52, and extend in a direction forming an angle other than a right angle with respect to the direction connecting the rotation axis of the third gear shaft 54 and the rotation axis of the second gear shaft 52.

Second Modification Example

In the first example, the gap S1 may extend in the direction (up and lower direction) connecting the rotation axis of the third gear shaft 54 and the rotation axis of the second gear shaft 52.

Third Modification Example

In the first and second examples, the third intermediate gear 62 and the fourth intermediate gear 64 may be spur gears. Also, in another modification example, the tooth traces of the third intermediate gear 62 and the fourth intermediate gear 64 may be inclined so as to be displaced rearward in the rotational direction of the third intermediate gear 62 and rearward in the rotational direction of the fourth intermediate gear 64 as they move away from the center housing 24.

Fourth Modification Example

The gap S1 of the first example and the gap S2 of the second example may be provided only in the inner region surrounded by the annular region 80.

Fifth Modification Example

The left gear unit 32 and the right gear unit 36 do not have to have structures that are plane-symmetrical with each other.

Sixth Modification Example

The left gear unit 32 and the right gear unit 36 may each be connected to an engine.

Seventh Modification Example

The left motor 30 and the right motor 34 do not have to have structures that are plane-symmetrical with each other.

Eighth Modification Example

A gap may be provided in at least one annular region of the annular region located between the bearing support portion BS4 on the left side and the bearing support portion BS4 on the right side, and the annular region located between the bearing support portion BS6 on the left side and the bearing support portion BS6 on the right side.

Ninth Modification Example

In the first and second examples, the left gear unit 32 and the right gear unit 36 are so-called three-shaft type gear units including the first gear shaft 50, the second gear shaft 52, and the third gear shaft 54. The left gear unit 32 and the right gear unit 36 may be two-shaft type or four-shaft type gear units. When the left gear unit 32 and the right gear unit 36 are two-shaft type gears, the first gear shaft is connected to the motors 30, 34 and the second gear shaft is connected to the rear wheels 14, 18. In this case, the second gear shaft connected to the left rear wheel 14 and the second gear shaft connected to the right rear wheel 18 are respectively examples of the "first rotation shaft" and the "second rotation shaft". When the left gear unit 32 and the right gear unit 36 are four-shaft type gear units, the first gear shaft is connected to the motors 30, 34. A fourth gear shaft is connected to the rear wheels 14, 18 and is also connected to the first gear shaft via the second gear shaft and third gear shaft. In this case, the fourth gear shaft connected to the left rear wheel 14 and the fourth gear shaft connected to the right rear wheel 18 are respectively examples of the "first rotation shaft" and the "second rotation shaft".

Further, the technical elements described in this specification or the drawings exhibit technical usefulness singly or in various combinations, and are not limited to the combinations described in the claims as filed. Furthermore, the technologies illustrated in this specification or the drawings can achieve multiple objectives simultaneously, and achieving one of the objectives has technical utility in itself.

What is claimed is:

1. A power transmission device comprising:
   a housing having a first chamber, a second chamber, and a center housing, the center housing being located between the first chamber and the second chamber;
   a first gear unit accommodated in the first chamber and having a first rotation shaft; and
   a second gear unit accommodated in the second chamber and having a second rotation shaft located coaxially with the first rotation shaft, wherein:
   the center housing has a flat plate portion, a first bearing support portion protruding from the flat plate portion toward the first chamber and supporting a first bearing located at a first end of the first rotation shaft, and a second bearing support portion protruding from the flat plate portion toward the second chamber and supporting a second bearing located at a first end of the second rotation shaft; and
   the flat plate portion is provided with a gap defined in at least a part of an annular region in the flat plate portion interposed between the first bearing support portion and the second bearing support portion, wherein the gap is a space defined inside the flat plate portion, the gap is provided over an entirety of the annular region, and the gap extends from the annular region to an outer peripheral edge of the flat plate portion along a first direction perpendicular to a rotation axis direction of the first rotation shaft.

2. The power transmission device according to claim 1, wherein
   the first gear unit further has a first gear supported by the first rotation shaft, a third gear meshing with the first gear, and a third rotation shaft supporting the third gear, and
   the first direction is a direction forming an angle with a direction connecting a rotation axis of the first rotation shaft and a rotation axis of the third rotation shaft.

3. The power transmission device according to claim 1, wherein
   the first gear unit further has a first gear supported by the first rotation shaft, a third gear meshing with the first gear, a third rotation shaft supporting the third gear, and a third bearing support portion for supporting a third bearing located at a second end of the first rotation shaft, a tooth trace of the first gear is inclined so as to be displaced forward in a rotational direction of the first gear as the tooth trace approaches the center housing.

4. The power transmission device according to claim 1, wherein the gap extends from an inner region surrounded by the annular region to an outer region located outside the annular region.

5. The power transmission device according to claim 1, wherein the first gear unit and the second gear unit have structures that are plane-symmetrical with each other.

6. A drive device for a vehicle comprising:

the power transmission device according to claim 1;

a first motor accommodated in the first chamber and configured to drive the first gear unit; and a second motor accommodated in the second chamber and configured to drive the second gear unit, wherein the first motor and the second motor are arranged plane-symmetrically with each other, the first gear unit is a reduction gear configured to amplify torque of the first motor, and the first rotation shaft of the first gear unit is connected to a left wheel of the vehicle via a drive shaft, and the second gear unit is a reduction gear configured to amplify torque of the second motor, and the second rotation shaft of the second gear unit is connected to a right wheel of the vehicle via a drive shaft.

* * * * *